July 3, 1962  T. O. MATHUES ET AL  3,042,137
VEHICLE INSTRUMENT AND DASHBOARD ASSEMBLIES
Filed Sept. 9, 1959  5 Sheets-Sheet 1
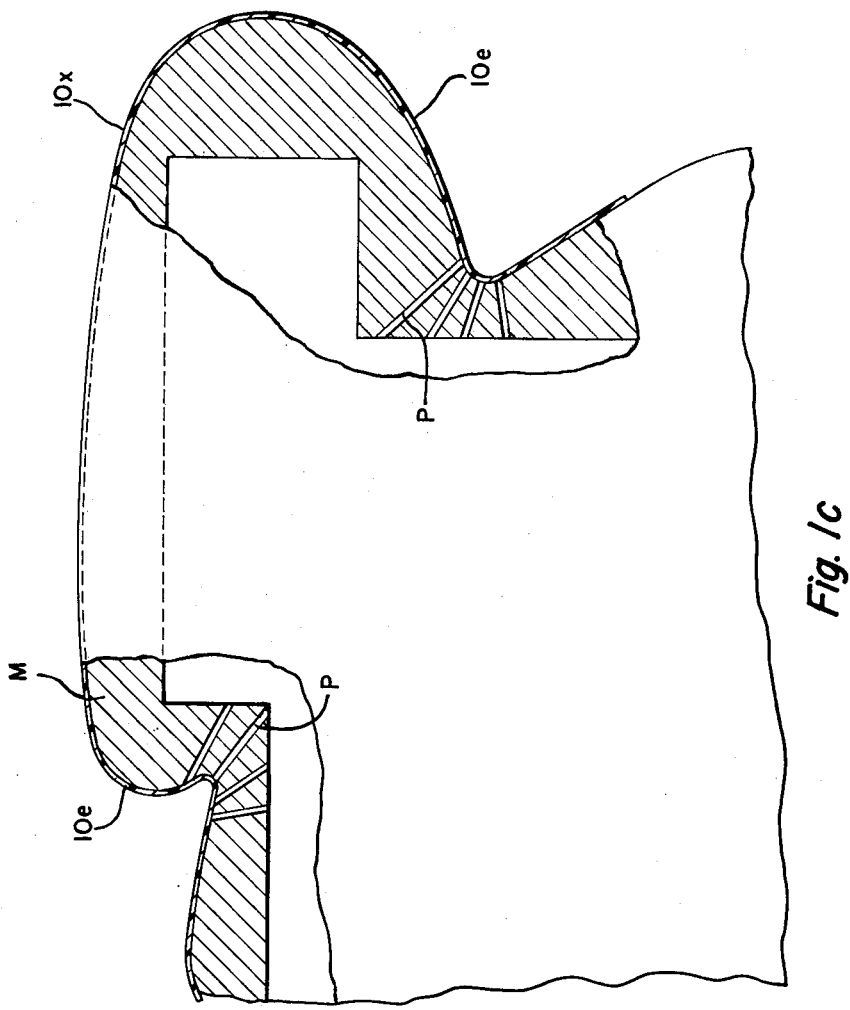
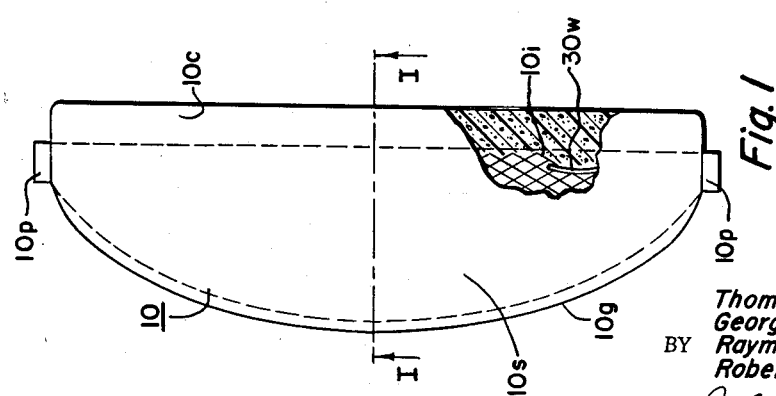
INVENTORS.
Thomas O. Mathues
George W. Beck
BY Raymond C. Davis
Robert W. Forward
John T. Marvin
Their Attorney

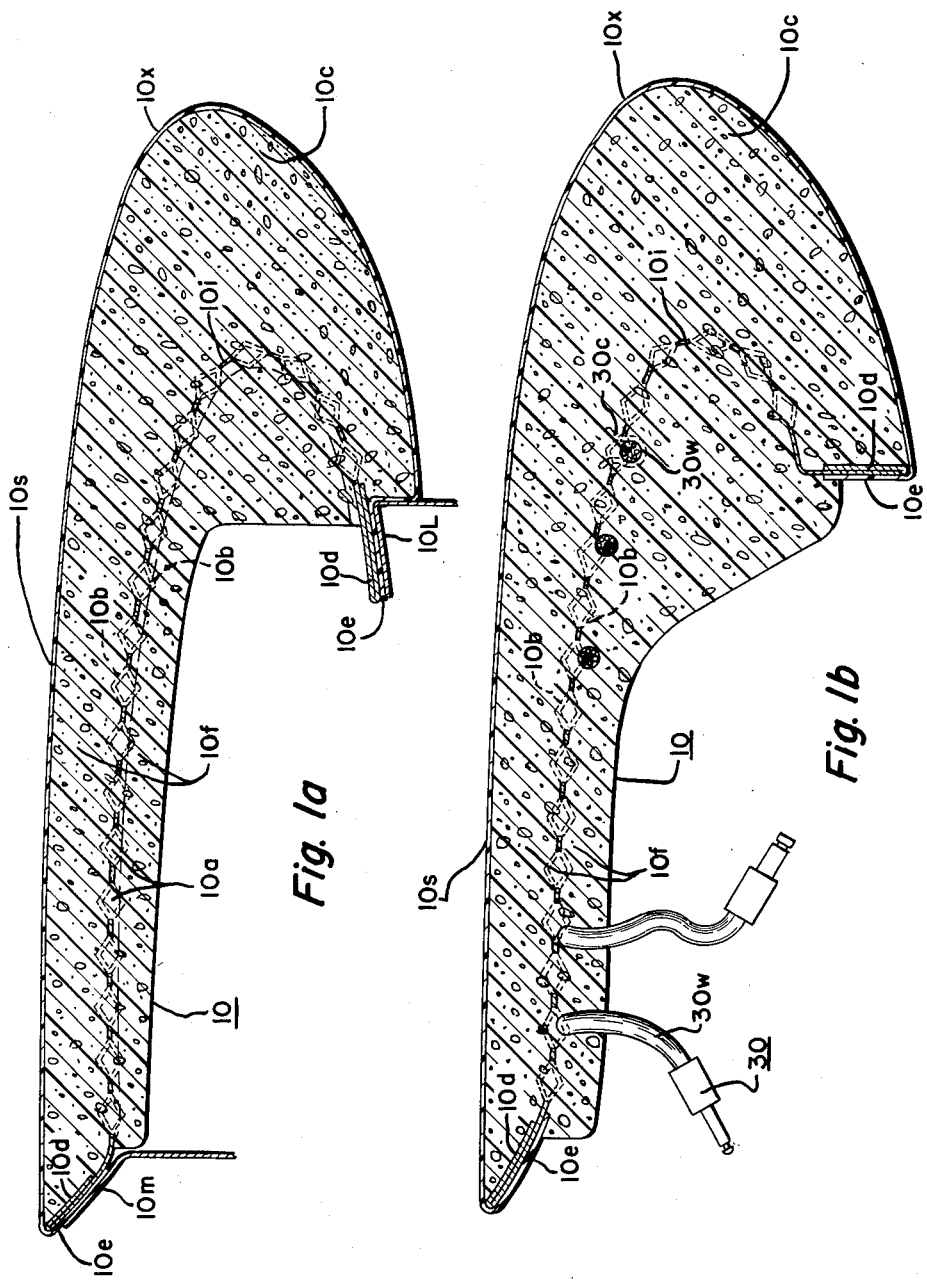

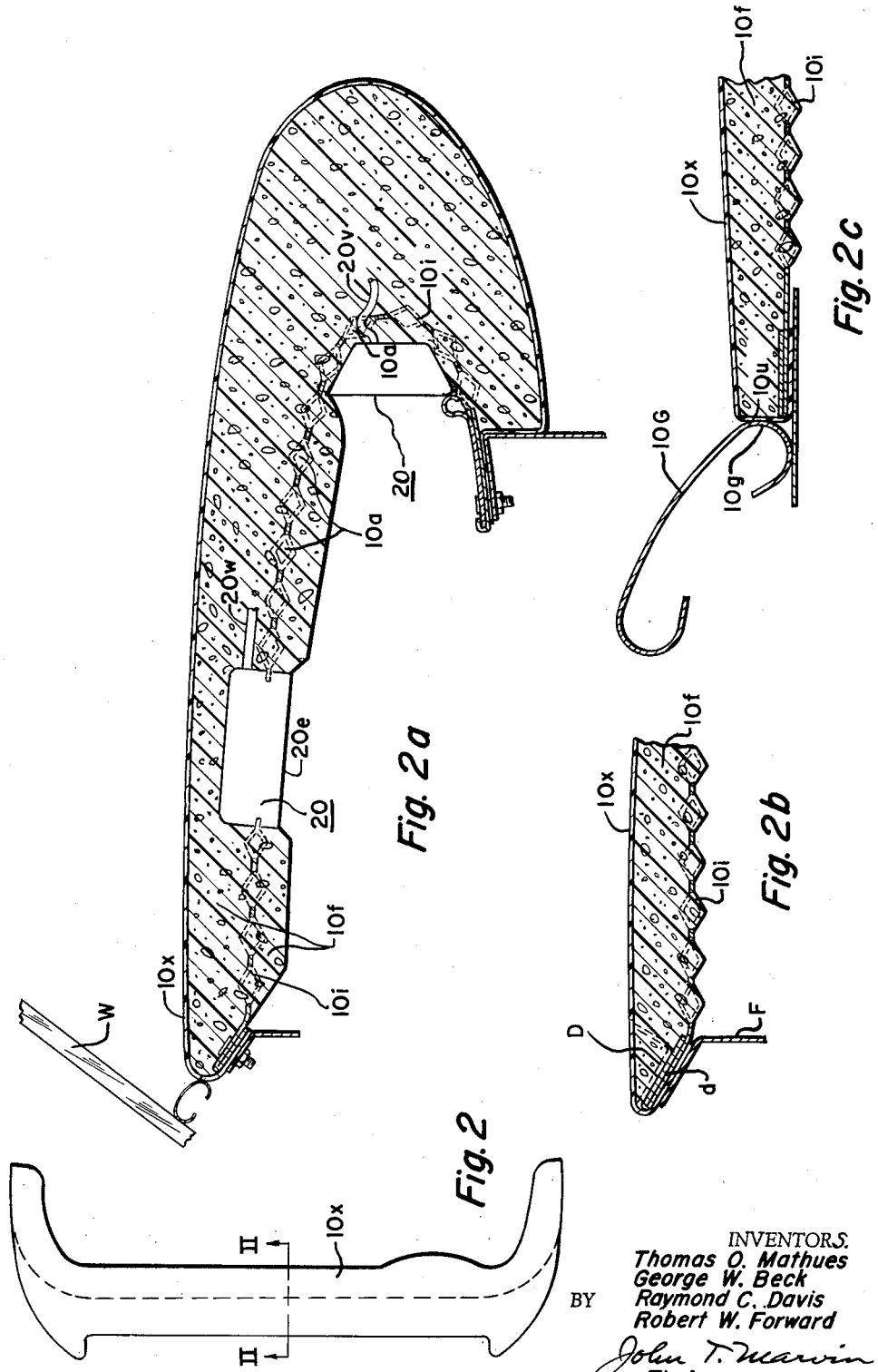

July 3, 1962 T. O. MATHUES ET AL 3,042,137
VEHICLE INSTRUMENT AND DASHBOARD ASSEMBLIES
Filed Sept. 9, 1959 5 Sheets-Sheet 4
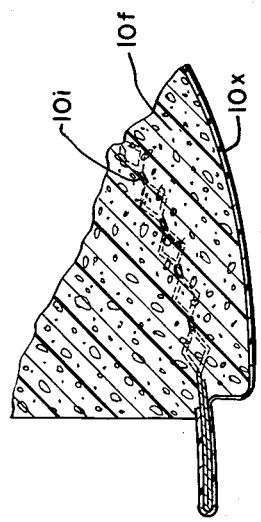
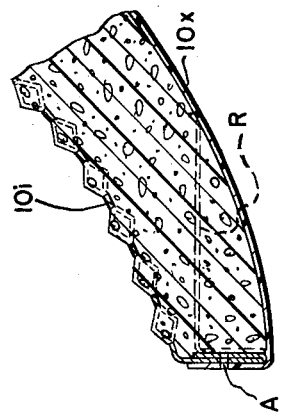
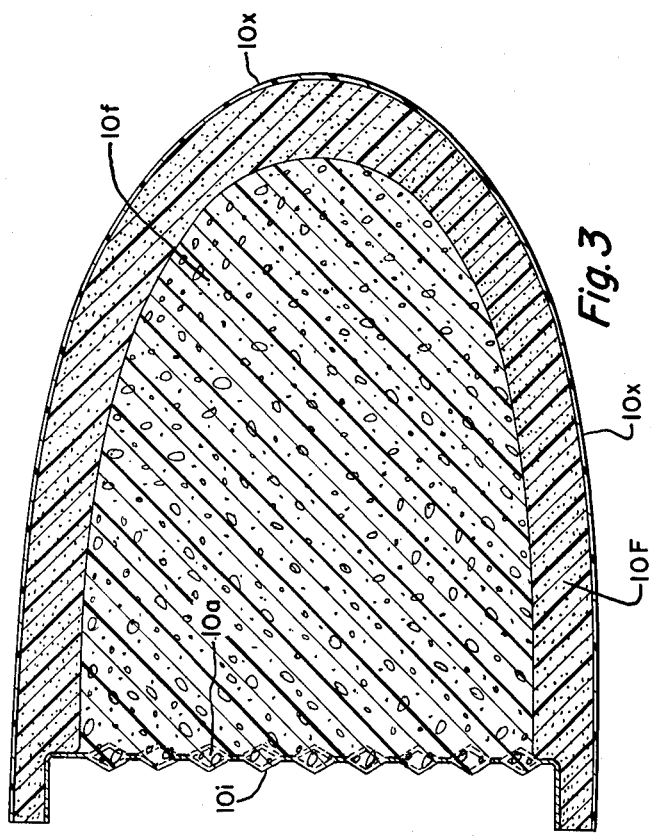
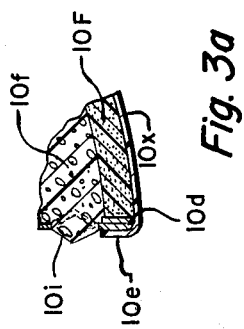
INVENTORS.
Thomas O. Mathues
George W. Beck
BY Raymond C. Davis
Robert W. Foward
John T. Marvin
Their Attorney

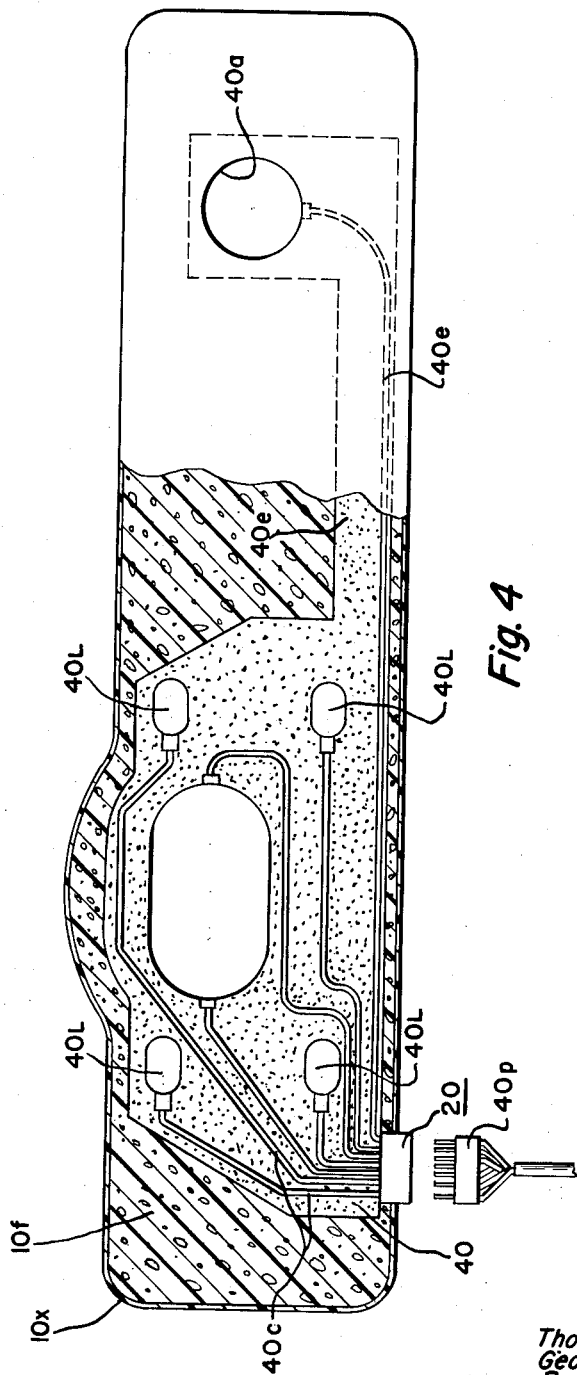

United States Patent Office 3,042,137
Patented July 3, 1962

3,042,137
VEHICLE INSTRUMENT AND DASHBOARD ASSEMBLIES
Thomas O. Mathues, George W. Beck, Raymond C. Davis, and Robert W. Forward, all of Dayton, Ohio, assignors to General Motors Corporation, Detroit, Mich., a corporation of Delaware
Filed Sept. 9, 1959, Ser. No. 838,944
14 Claims. (Cl. 180—90)

This invention relates to dashboard structures and particularly a method and means for forming a crashpad type of dashboard panel with and without electrical circuit means therewith.

An object of this invention is to provide a new and improved dashboard assembly using foam material relative to insert means adapted to be deformed when subjected to specific loads and adapted to enhance potential safety value thereof.

Another object of this invention is to provide a relatively compressible protective device for vehicle interiors including an expanded and/or apertured insert means molded integrally in a unit with a skin foam whereby there is realized a reduction in total weight of insert, foam, and skin assembly and whereby increased rigidity is obtanied in addition to filling of space fully with one or more foam materials.

A further object of this invention is to provide a method and means of forming completely to shape a protective device for vehicle interiors including use of an insert relative to which an outer cover is provided and adapted to be positioned in a shape maintained in a mold by means of differential pressure so that foam can be supplied and cured into place relative to the insert and cover requiring a minimum, if any, of post forming after the molding operation.

Another object of this invention is to provide a vehicle dashboard structure including an insert means relative to which a partial or complete wiring circuit such as a wiring harness and/or printed circuit is secured prior to filling foam relative thereto into a contoured shape and thereby eliminating loose wiring under a vehicle dashboard and incorporating electrical connectors for connections between electrical components such as an instrument cluster or wiring harness trunk outlet on an adjacent portion of a vehicle body and thereby resulting in a pre-tested ready to install complete dashboard and affording advantages such as freedom from wire chafing and resultant electrical fires, freedom from hard to find rattles, lower overall cost, greatly simplified instrument mounting and connecting to electrical circuitry as well as possible shock mounting for instruments.

A further object of this invention is to provide a nonmetallic dash panel for vehicles and adapted to be capable of collapsing under severe impact without causing undue forces on a human body or breaking in such a way that puncture wounds could be inflicted because an integral foam pad and insert are made reasonably soft and crushable of electrical insulating and non-conducting materials.

Another object of this invention is to provide an instrument panel cover assembly utilizing a skin fastened in place relative to an insert perforated to permit flow of resilient foam material on opposite sides of the insert adapted to provide a flange formed completely to shape along an edge thereof for mounting relative to a vehicle body with and without a garnish molding or trim member.

Further objects and advantages of the present invention will be apparent from the following description, reference being had to the accompanying drawings wherein preferred embodiments of the present invention are clearly shown.

In the drawings:
FIGURE 1 is a plan view of a dashboard structure in accordance with the present invention.

FIGURE 1a is a cross-sectional elevational view taken along line I—I of FIGURE 1 and representing one embodiment of the present invention.

FIGURE 1b also is a cross-sectional elevational view taken along line I—I of FIGURE 1 and representing another embodiment of the invention.

FIGURE 1c is a cross-sectional elevational view outlining diagrammatically a differential-pressure forming mold for use in a method and means of forming completely to shape a protective device for vehicle interiors in accordance with the present invention.

FIGURE 2 is a plan view of another dashboard structure in accordance with the present invention.

FIGURE 2a is a cross-sectional elevational view taken along line II—II of FIGURE 2 and representing a modification of structure of FIGURE 1b.

FIGURES 2b, 2c, 2d, and 2e are fragmentary cross-sectional elevational views showing modifications of structure usable with structures of FIGURES 1a, 1b, and 2a.

FIGURE 3 is a cross-sectional elevational view illustrating multiple density or multiple layers of foam on a dashboard panel.

FIGURE 3a represents a modification of one portion of structure shown in FIGURE 3.

FIGURE 4 is a front view of a dashboard in accordance with the present invention and incorporating a printed circuit means therein.

FIGURE 1 shows a top view of a dashboard structure generally indicated by numeral 10 and including a shelf portion 10s as well as a laterally projecting curved cushion portion 10c. The cushion portion 10c extends laterally from edge to edge where flanges for side projection 10p of an insert means 10i can be provided for permitting fastening or mounting of the dashboard structure relative to a vehicle body. A garnish or trim molding portion 10g is provided having a curved contour corresponding substantially to a curved base of a windshield in a usual manner.

As better seen in FIGURES 1a and 1b, the insert means 10i is preferably formed of a piece of sheet metal provided with open meshes or lattice work. The insert 10i can be constructed by slitting a metal sheet and then opening the slits into meshes by a separate operation of pulling or stretching or expanding the sheet metal by a bending operation so as to deform the bars connecting the slit portions and body of the sheet. Individual bars 10b of the insert 10i can be bent in opposite directions relative to each other as best seen in FIGURES 1a and 1b. The crashpad type of dashboard panel in accordance with the present invention also includes a covering or external sheet 10x of flexible material having an attractive color and corresponding or being complementary to the interior decoration of a vehicle. This covering can be made of leather, imitation leather, or leather-like composition of flexible skin material having a composition including vinyl resin and/or styrene acrylonitrile resin which is resistant to distortion and deformation due to high temperatures and heat such as from rays of the sun which can shine through a windshield of glass adjacent to the dashboard. The covering includes an inwardly extending edge portion 10e adapted to be fitted to or sandwiched between a folded or doubled over portion 10d along laterally spaced edges of the insert means 10i. The edge 10e closest to the windshield of glass can be fitted between this doubled over portion 10b and a flange of attaching metal 10m which can be part of or attached to a fire wall of a motor vehicle. An L-shaped attaching portion 10L can be provided in a position spaced laterally to one side of and substantially below the flange of attaching metal 10m such that the crashpad of the dashboard has a structure including the upper platform portion 10s and the curved portion 10c referred to with FIGURE 1. FIGURES 1a and 1b illustrate how foam material 10f is filled into space on opposite sides of the insert means 10i. Apertures 10a are provided by the expanded metal of the insert means and foam material that rises evenly is filled into at least a part of the space defined by the shape of the covering material 10x. Any foam material that has insulating properties can be used. For example, foam rubber or latex which is readily flowable can be filled into a cavity and excess latex can be scraped away using a knife. However, in accordance with the present invention, the crashpad is adapted to be free of any voids or irregularities in the distribution of foam material relative to the expanded metal insert means 10i and covering material 10x. Thus, no tools such as a knife can ever be used to place or force foamed material such as latex relative to a perforated sheet backing.

Preferably, in accordance with the present invention, an isocyanate base insulation material is provided and caused to foam in space relative to the covering material 10x and expanded material insert means 10i. Elastomeric foam materials which are particularly useful for the purpose of the present invention are the polyurethane foams having varying desired densities. These foams may be formed by reacting a wide variety of polymeric materials such as polyesters, polyesteramides, polyalkylene glycol, castor oil and other materials having a plurality of reactive hydrogen groups with organic polyisocyanates, in the presence of accelerators and/or cross linking agents and/or other addition agents such as plasticizers for modifying the characteristics of the foam. The formation of foamed polyurethane plastics involves a series of complex, physical and chemical reactions in which the evolution of carbon dioxide gas resulting from a reaction of carboxyl and isocyanate groups and/or between water and isocyanate groups causes the foamed or cellular character of these plastics.

Examples of suitable polymeric materials which may be used in the production of suitable foams for use in the present invention are polyesters, and polyesteramides such as may be obtained by condensing a variety of polybasic acids, preferably dibasic acids such as adipic, sebacic, phthalic, oxalic, malonic, succinic, maleic, fumaric, itaconic, etc., with polyalcohols such as ethylene glycol, diethylene glycol, glycerol, sorbitol and/or amino alcohols such as ethanolamine and amino propanol. Alkylene glycols and polyoxyalkylene glycols which may be used include ethylene glycol, propylene glycol, styrene glycol, diethylene glycol and polypropylene glycol and copolymers of these glycols. A high grade castor oil may also be used.

Examples of suitable organic polyisocyanates which may be used include aromatic isocyanates such as toluene 2,4 diisocyanate, toluene 2,6 diisocyanate and mixtures thereof, naphthalene 1,5 diisocyanate and m-phenylene diisocyanate, etc., and mixtures of these materials.

Examples of components which may be used for promoting the polyaddition reaction between the above mentioned polymeric materials having free hydrogen reactive groups and organic polyisocyanates, and providing essential acceleration of the reaction include ethyl ethanolamine, diethyl ethanolamine, tyridine, hexahydro dimethylaniline, methyl piperazine, dimethyl piperazine, tribenyl amine, N-morpholine, N-methyl morpholine, and N-ethyl morpholine. The relative hardness of the polyurethane foam can be varied by a suitable selection in suitable proportion of the initial foam forming ingredients.

It is apparent that properties of a finished foam material are dependent upon many factors. As foaming occurs, bubbles increase in size, additional bubbles are formed, and some bubbles are lost due to ocalescence. Concurrently, the polymerization reaction effects an increase in viscosity and raises the temperature until finally gel point is reached and approached such that viscosity becomes very high and increases rapidly to be followed by solidification such that bubbles become fixed and the polymer becomes strong enough to support itself. Foams are recognized as being thermodynamically unstable such that there is an inherent tendency toward collapse. Surface tension affects foam stability and therefore foam stabilizers which are surface active materials are provided to cause appreciable surface-tension lowering so as to lessen the thermodynamic force toward collapse. Silicones are commonly used as additives in polyurethane foaming operations. Surface-active additives such as typical silicones, polydimethylsiloxanes have appreciable effect on surface-tension during preparation of polyurethane foams. The foaming operation is complete in a matter of minutes and therefore an effective additive must lower surface-tension sufficiently and must do so quickly. Contraction and shrinkage of resilient and rigid polyurethane foams can be averted frequently by careful control of prepolymer preparation and suitable adjustments of the foam recipe. Since an isocyanate-water reaction is strongly exothermic and causes a temperature rise during foaming, there can be some shrinkage or contraction as the foam cools back to room temperature when the gas contained therein contracts. However, major shrinkage will not occur if the curing reaction is very rapid compared to the rate of gas permeation and the polymer has become mechanically strong enough before sufficient vacuum is built up to distort the foam permanently. Also, if the foam structure opens up before enough pressure differential builds up, no shrinkage occurs.

Preferably in accordance with the present invention, the foam material serves as a filler relative to the covering 10x which is sheet material. This sheet material can be obtained commercially in various colors and sizes. Various types of plastic sheet material can be used and preferably the covering 10x is vacuum formed as a rubber resin copolymer skin to a shape along its edges that will permit it to be cemented in place on an insert such as 10i without further postforming after the molding operation. This is illustrated specifically where an insert is molded as a part of the cover and foam assembly as illustrated in views of FIGURES 1c, 2d, and 2e. Previously no such cover or skin has been formed completely to shape a flange around an insert so as to mold the assembly into an integral unit of skin foam and insert. Previously, it has been practice to mold skin and foam and then to cement the insert in place in a separate operation. The view of FIGURE 2e illustrates use of an expanded metal insert 10i to which the formed skin or covering 10x is cemented prior to the molding operation. A recess or cavity R can be provided as shown in FIGURE 2e so that there is access to an aperture A through which a suitable mounting means such as a screw or bolt can be fitted for attaching the instrument panel assembly in accordance with the present invention relative to a vehicle body. Included as advantages of the structure in accordance with the present invention it is noted that where it is desirable to have an insert backing up a skin and foam subassembly, the use of expanded metal makes it possible to completely cement or fasten the skin or covering in place on the insert and subsequently to pour the foam through the expanded metal insert in the correct location anywhere in the dashpad panel or pad assembly. This assembly can then be put into a mold for curing. Also, through the use of an expanded metal insert it is possible to provide an insert shape and to use insert materials which will crush when subjected to specific loads so as to enhance the potential safety value of the instrument panel cover assembly. Also the present invention makes it possible to foam pads with an insert in place where a solid insert would make it impossible to reach and fill certain areas. Yet, it is possible to use an insert for added rigidity in the molded assembly as an aid in handling and shipping. Use of structure in accordance with the present invention effects a reduction in total weight of insert, foam, and skin or covering assembly in view of the practicability of pouring foam material through an expanded metal insert.

Preferably the covering 10x has a non-gloss external surface which can be "predecorated" wtih a suitable pattern or imitation leather finish as the covering is supplied in sheet form. The plastic sheet is vacuum formed relative to a male mold as outlined in FIGURE 1c. This male mold M is provided with a plurality of passages P through which pressure differential can be effected so as to cause shaping of the sheet to the contour of the dashboard panel desired. Preferably the plastic sheet is clamped by an air tight frame (not shown) relative to the male mold M. A heater is positioned above the sheet until it is uniformly softened in a well-known manner and air is exhausted from the mold area and atmospheric pressure forces the plastic sheet against the contours of the mold M. Reverse air pressure is used to separate a formed part from the mold. Subsequent to vacuum forming, the covering can be cemented into place on an insert 10i without further postforming after the molding operation. Many plastics are available in sheet form. Plastic sheet material in an extruded form is available and can be used as the covering 10x because plastic material such as cellulose acetate butyrate has good impact resistance and is available in a wide range of opaque colors. Butyrate has very suitable forming characteristcis and has a relatively low moisture absorption rate. Extruded acrylic sheet material can also be used for the covering 10x because of ultraviolet resistance. Poly vinyl chloride is a premium material of high strength and durability but available at slightly above average cost. Vinyl copolymer (vinyl chloride-acetate copolymer) is ideal for parts such as a dashboard covering material requiring deep drawing. Vinyl copolymer has a durable color-retaining abrasion resistance surface.

Another suitable sheet material for the covering 10x is acrylonitrile-butadiene-styrene which provides high strength, good corrosion resistance and electrical properties. The acrylonitrile-butadiene-styrene sheet material is available in a range of formulations making possible high dimensional stability at temperatures as low as −50° F. or as high as 230° F. It is to be understood that the male mold M illustrated in FIGURE 1c must be provided with vacuum holes or passages P placed strategically in the mold recesses to provide clean pull-down of the sheet.

FIGURES 2b and 2c illustrate structures in accordance with the present invention including the expanded insert means 10i, foam 10f and covering 10x relative to which garnish moldings are incorporated. Local depressions D as shown in FIGURE 2b can be provided for permitting attachment of the dashboard panel assembly from an upper surface by fitting a screw or bolt relative to an opening d relative to a solid structural panel such as a fire wall F. However, the dashboard panel assembly in accordance with the present invention can also be mounted in abutting relation with a garnish molding 10G having a curved portion 10g in contact with an upwardly extending portion 10u of the covering 10x shown in FIGURE 2c.

In accordance with the present invention, FIG. 2 illustrates another embodiment of a dashboard panel assembly including a plastic sheet material covering 10x and foam material 10f filled into space relative to the covering and an expanded insert means 10i with a partial or complete wiring harness incorporated therein as best seen in FIGURE 2a which is a cross sectional elevational view taken along line II—II of FIGURE 2. A socket means or plug generally indicated by numeral 20 can be press-fitted or suitably fastened to the expanded metal insert 10i into which a suitable opening is formed for receiving the plug 20. A wire 20w can be provided extending outwardly from the plug relative to which a suitable electrical connector can be attached along an exposed surface 20e of the plug. The plug can be provided with metal terminals which are crimped relative to the wire 20w in a well-known manner. Wire such as 20w can be attached individually or as a group of wires of a harness relative to the insert 10i before the foaming operation. The wire can be attached to the insert 10i by means of small loops of wires or clips which are preferably U-shaped and embrace the wire and engage apertures 10a of the expanded metal insert means 10i. It is also possible for wire such as 20w to be fitted through these apertures 10a directly such that the need for separate clips is eliminated. A wire 20v is shown in the right hand portion of FIGURE 2a in a position wherein the wire is fitted relative to an aperture 10a of the insert means 10i. A windshield W is shown at a location adjacent to the covering 10x relative to which no garnish molding is provided. More than one plug or connector such as 20 can be provided in the dashboard assembly as shown in FIGURE 2a. Attachment of wiring and/or a group of wires as a harness relative to the insert before the foaming operation assures adequate wiring in predetermined locations for attachment of the wiring relative to various instrument panel accessories such as panel cigarette lighters, electric clocks, and/or courtesy lamps and panel lighting. Provision of foam material 10f relative to both the insert means 10i and wiring assures elimination of loose wire under the instrument panel cover assembly such that electrical short circuits due to rubbing of wiring relative to each other and/or rattles and squeaks can be avoided. Use of printed circuits such as disclosed in Patent 2,825,038—Woofter, assigned to the assignee of the present invention can be realized for effecting instrument panel illumination. A printed circuit assembly such as shown in FIGURE 14 of Patent 2,825,038 can be partially or substantially imbedded in foam material and can be suitably secured to the expanded metal insert means 10i by use of suitable fasteners or clips. The incorporation of plug outlets attaching wires or wiring harnesses to either an instrument cluster or trunk outlet can be readily accomplished in accordance with the present invention. FIGURE 4 is a front view of an instrument panel or dashboard assembly incorporating a printed circuit board generally indicated by numeral 40 having conducting material 40c thereon in predetermined locations for establishing electrical connection between a male pronged plug member 40p relative to electrical gage elements and/or light bulbs 40L that can be used to illuminate gages indicating various conditions such as temperature and fuel content of a gasoline tank. The printed circuit board 40 is shown imbedded in foam material such as 10f and a covering 10x is shown extending relative to the foam material. As illustrated in FIGURE 4, the printed circuit board can be extended to include a laterally extending portion 40e relative to which an aperture 40a is provided to receive an accessory such as an electric clock. Suitable conducting material 40c is provided for establishing an electrical connection relative to the socket or opening 40a into which the accessory is fitted. It is to be understood that in place of the extension 40e, a printed circuit board such as 40 can be provided in combination with wiring such as 20w or 20d shown in FIGURE 2a and this wiring can extend from a plug such as 20 relative to an added accessory such as a clock. Suitable lamp socket and terminal means for use in conjunction with printed circuits are also disclosed in co-pending applications S.N. 717,003, now Patent No. 2,953,769, and S.N. 717,004, now Patent No. 3,001,165—Woofter, filed February 24, 1958. Suitable sockets and connectors for use in conjunction with printed circuit boards are disclosed in co-pending applications S.N. 715,680, now Patent No. 2,911,610, and 715,704—Kirk, filed February 17, 1958.

As a further modification of a dashboard panel assembly in accordance with the present invention, FIGURES 3 and 3a illustrate use of multiple density or multiple types of foam in an instrument panel cover assembly. Accordingly, an insert means such as 10i is provided having apertures 10a through which an outer peripheral light density foam material 10F is filled into a location immediately adjacent to the plastic sheet material or covering 10x. An impact foam material 10f having greater rigidity is filled into space intermediate the light density foam material 10F and the insert means 10i. FIGURE 3a illustrates closure of space by end portion 10e of covering 10x in conjunction with the bent over or double folded portion 10d of the insert means 10i. The light density foam material 10F forms an outer layer of foam which is compounded to provide a soft resilient feel and the underlayer of impact foam material 10f is compounded to provide optimum shock absorbing qualities through the use of low resilient foam material.

It is apparent that a dashboard panel assembly in accordance with the present invention is such that the dashboard can collapse under impact of the human body so as not to injure a passenger. The insert means 10i provides sufficient rigidity for support of electrical accessories such as a radio and clock which can be made in the form of plug-in units so as to be assembled and dis-assembled from the dashboard. In effect the dashboard assembly in accordance with the present invention provides a substantially non-metallic dash panel constructed from a material which is sufficiently strong to be self-supporting and also strong enough to mount such accessories and electrical structures as an instrument cluster, cigarette lighter, glove box, radio, clock, etc., and yet is not a conductor of electricity and also is reasonably soft and crushable. The dashboard panel assembly is capable of collapsing on severe impact without causing undue forces on the human body or breaking in such a way that puncture wounds could be secured. Both rigid and semi-rigid isocyanate foam materials can be filled relative to the expanded insert means 10i and either a wiring harness or printed circuit wiring means individually or in combination can be incorporated in the dashboard panel itself for establishing electrical connection. Such electrical connection relative to a dashboard panel permit pretesting and facilitate installation of a complete dashboard panel assembly with wiring and electrical connections in place relative to a vehicle body. The dashboard panel assembly in accordance with the present invention provides freedom from wire chafing and resultant electrical fires. The present invention also provides freedom from hard to find rattles. Overall cost of the dashboard panel structure is reduced and there is provided a greatly simplified instrument mounting and connection relative to electrical circuits. Also, the foam material provided relative to the expanded insert provides shock mountings for instruments heretofore not obtainable.

The expanded metal insert means 10i is particularly useful with polyisocyanate foam materials which are not flowable as are latex foams. The polyisocyanate material can be filled only partly into space relative to the insert and covering material 10x and due to the apertures 10a can foam and rise evenly because the apertures permit release of gases which would be trapped relative to a solid insert. The foam material can be filled into a cavity such that at least one side of the insert means 10i is in immediate contact therewith as shown in FIGURE 3 or the foam material can be filled into a cavity such that the insert means 10i is fully imbedded in the foam material as shown in FIGURES 1a and 1b for example. Wiring including plugs or prongs can be provided as shown in FIGURES 1b and 2a. Jack-type plugs 30 attached to wires 30w can be provided in FIGURE 1b and a U-shaped clip means 30c can be used to hold wire such as 30w in place as shown in FIGURE 1b.

While the embodiments of the present invention as herein disclosed constitute preferred forms it is to be understood that other forms might be adopted.

What is claimed is as follows:

1. A dashboard assembly for a motor vehicle comprising, a covering of sheet material having a shelf portion and a laterally projecting curved cushion portion, an expanded metal insert means having said covering attached thereto along edges thereof, foam material provided in space between said covering and said insert means, and electrical conducting means separate and distinct from said metal insert means though embedded in said foam material in locations adjoining said insert means so as to be insulated therefrom and to provide freedom from chafing relative thereto which can thus avoid short circuits with resultant electrical fires, as well as freedom from hard to find rattles avoided between said electrical conducting means and said insert means because said electrical conducting means is embedded in said foam material as insulating support between said insert means and said conducting means while simultaneously as shock resistant mounting therefor.

2. In a dashboard assembly, the combination comprising, a covering of sheet material having a shelf portion and a laterally projecting curved cushion portion, an expanded metal insert means having said covering attached thereto along edges thereof, foam material provided in space between said covering and said insert means, and a printed circuit electrical conducting means on an insulating board supported relative to said insert means.

3. The combination of claim 2 wherein said insulating board includes mounting apertures for panel lighting and electrical accessories such as an electric clock and a lighter, and other electrical devices and gauges.

4. The combination of claim 2 wherein a socket for electrical connection with said printed circuit conducting means is provided relative to said foam material and said covering.

5. In a dashboard assembly, the specific combination comprising, a covering of sheet material having a shelf portion and a laterally projecting curved cushion portion, an expanded metal insert means spaced to one side of said covering at a predetermined distance therefrom such that edges of said insert means and said covering are joined relative to each other, foam material provided in space between said covering and said insert means, and electrical conductors supported by said insert means in locations directly adjoining said insert means though embedded in said foam material as protective support between said insert means and said conductors afforded insulated freedom from short circuiting thereto as well as freedom from hard to find rattles of said conductors relative to said insert means because said electrical conductors are embedded in said foam material as shock resistant mounting therefor.

6. The combination of claim 5 wherein said conductors are insulated wires fitted into and twisted through apertures formed by the expanded metal to which the conductors are attached in predetermined locations.

7. The combination of claim 5 wherein said conductors are insulated wires surrounded at least in part by and positively held by clips snapped into engagement with said insert means directly though said wires and clips become covered by said foam material that insulates and anchors the conductors against chafing and vibration though said foam material, insert means and conductors are crushable under impact in such a way that puncture wounds cannot be inflicted relative to a body thrown thereagainst.

8. In manufacture of a dashboard panel pre-wired for safe use, an improved assembly method of forming completely to shape a protective device for vehicle interiors, comprising the steps of vacuum-forming a sheet of plastic material in a shape including a platform portion and a curved cushion portion, utilizing the sheet of material as a container-like skin fastened in place relative to an expanded metal insert having apertures therebetween, supporting an electrical conducting means in predetermined locations relative to said insert means, and anchoring as well as fully insulating said conducting means against chafing, vibration and shock by filling foam material directly through insert apertures into space in between the skin and insert means so as to embed said conducting means therewith.

9. A vehicle dashboard structure, comprising, an expanded metal insert means with apertures therethrough, a covering of plastic sheet material joined along edges to said insert means and having a platform portion as well as a curved cushion portion spaced a predetermined distance from said insert means, electrical conducting means supported by said insert means and separate and distinct therefrom though located adjacent thereto, and a filling means of flowable though curable resilient material provided between said covering and said insert means engulfed where apertured so as to fully embed said electrical conducting means per se against chafing, vibration and shock movements relative thereto.

10. The dashboard structure of claim 9 in which said filling means is a polyisocyanate foam flowable through the apertures of said insert means and around said electrical conducting means.

11. A vehicle dashboard structure, comprising an expanded metal insert means having apertures therein, a covering of plastic sheet material joined along edges to said insert means and having a platform portion as well as a curved cushion portion spaced a predetermined distance from said insert means, electrical conducting means including plug-socket means supported by said insert means, and a polyisocyanate foam filling space between said covering and said insert means relative to said conducting means.

12. A dashboard assembly for a vehicle which includes a support therefor, comprising, a contoured structure releasably attached to the support for placement in a predetermined position relative to the vehicle and having socket-like openings, a plurality of instrumentalities carried by said structure, at least some of said instrumentalities being releasably engageable therewith individually to fit the socket-like openings, terminal connector means carried by said instrumentalities to facilitate electrical connections thereto, electrical wiring means carried by said structure and positioned so that terminal ends thereof are fixedly positioned in proximity with the terminal connections for said several instrumentalities, connector means on said ends adapted to be engaged with the terminal connectors on said instrumentalities for completing electrical circuits therewith, and a connector element carried to be supported per se by said structure and electrically connected to the ends of said electrical wiring means opposite to said terminal ends thereof and adapted to be releasably electrically connectable to actuating means for said several instrumentalities.

13. In a dashboard assembly for a vehicle having instrument and accessory components such as fuel gauge means, clock means, illuminating bulbs and the like, the combination comprising, a panel-like structure having an opening therethrough for the components, and a pre-wired part adapted to fit in a predetermined position relative to the opening of said panel-like structure and including a preformed portion of insulating material, wiring means such as conductors, printed-circuit conducting material and the like carried by said preformed portion, electrical connector means to establish interconnection between predetermined wiring means and components such as the instrument means, bulbs and the like, and a plug means adapted to establish electrical connection relative to said wiring means for energization of the components, said preformed portion and wiring means having a function as a subassembly relative to said panel-like structure such that said plug means can be readily fitted on and off thereto and such that at least some of said electrical connector means assure electrical connection as well as retention of components both relative to said subassembly as well as relative to said panel-like structure in a predetermined position therewith.

14. For a motor vehicle dashboard assembly subject to mounting of electrically energizable devices such as instruments, lights and the like, the combination therewith which comprises, a covering of sheet material having a shelf portion and a laterally projecting curved cushion portion, an expanded metal insert means having said covering attached thereto along edges thereof, foam material provided in space between said covering and said insert means, and electrical conducting means separate and distinct from said metal insert means though embedded in said foam material in locations adjoining said insert means so as to be insulated therefrom and to provide freedom from chafing relative thereto which can thus avoid short circuit with resultant fires in proximity to the vehicle dashboard assembly subject to mounting of the electrically energizable devices, said foam material with said electrical conducting means being embedded therein not only for avoidance as well as smothering of possible fire but also for freedom from annoyance by hard to find rattles avoided between said electrical conducting means and said insert means because said electrical conducting means is embedded in said foam material as insulating support between said insert means and said conducting means while simultaneously as shock resistant mounting therefor though crushable under impact in such a way that puncture wounds cannot be inflicated relative to a body thrown thereagainst.

References Cited in the file of this patent

UNITED STATES PATENTS

| | | |
|---|---|---|
| 2,070,760 | Straith | Feb. 16, 1937 |
| 2,332,357 | Uffelman | Oct. 19, 1943 |
| 2,626,163 | Scantlebury | Jan. 20, 1953 |
| 2,818,933 | Tell | Jan. 7, 1958 |
| 2,904,122 | Nordrum et al. | Sept. 15, 1959 |

FOREIGN PATENTS

| | | |
|---|---|---|
| 751,690 | Great Britain | July 4, 1956 |
| 799,774 | Great Britain | Aug. 13, 1958 |